US008231058B2

(12) United States Patent
Eriksen et al.

(10) Patent No.: US 8,231,058 B2
(45) Date of Patent: Jul. 31, 2012

(54) TRANSACTION PRODUCT ASSEMBLY WITH POCKET AND SUPPORTING BACKER

(75) Inventors: Jessica D. Eriksen, St. Paul, MN (US); Erin M. Borkowski, Andover, MN (US); Phillip L. Clark, Minneapolis, MN (US); Timothy P. Clegg, Manhatten Beach, CA (US); Anthony V. Roberts, Rolling Hills Estates, CA (US); Dennis R. Smith, Minnetonka, MN (US); John Dwyer, Oak Park Heights, MN (US); Stacy M. Jensen, Anoka, MN (US)

(73) Assignee: Target Brands, Inc., Minneapolis, MN (US)

( * ) Notice: Subject to any disclaimer, the term of this patent is extended or adjusted under 35 U.S.C. 154(b) by 455 days.

(21) Appl. No.: 12/508,978

(22) Filed: Jul. 24, 2009

(65) Prior Publication Data

US 2011/0017830 A1 Jan. 27, 2011

(51) Int. Cl.
*G06K 7/00* (2006.01)
(52) U.S. Cl. ........................................ 235/486; 235/487
(58) Field of Classification Search ........................ None
See application file for complete search history.

(56) References Cited

U.S. PATENT DOCUMENTS

| | | | |
|---|---|---|---|
| 3,759,305 | A | 9/1973 | McIntyre |
| 4,011,898 | A | 3/1977 | Hubbard |
| 4,722,376 | A | 2/1988 | Rhyner |
| 4,782,874 | A | 11/1988 | Chartier |
| 4,878,580 | A | 11/1989 | Johnston |
| 4,887,763 | A | 12/1989 | Sano |
| 5,133,496 | A | 7/1992 | Davidson et al. |
| 5,245,775 | A | 9/1993 | Goserud |
| 5,349,769 | A | 9/1994 | Okola |
| D351,619 | S | 10/1994 | Struhl |
| 5,377,836 | A | 1/1995 | Eisenbraun |
| 5,609,253 | A | 3/1997 | Goade, Sr. |
| 5,650,209 | A | 7/1997 | Ramsburg et al. |
| D383,903 | S | 9/1997 | Kopel |
| 5,667,247 | A | 9/1997 | Ramsburg et al. |
| D392,685 | S | 3/1998 | Smith |
| 5,740,915 | A | 4/1998 | Williams |
| 5,760,381 | A | 6/1998 | Stich et al. |
| 5,777,305 | A | 7/1998 | Smith et al. |
| 5,817,379 | A | 10/1998 | Rich et al. |

(Continued)

OTHER PUBLICATIONS

"Contactless Payments: Consumer Trends and Usage Preferences," firstdata.com, 2008, 2 pages.

(Continued)

*Primary Examiner* — Thien M. Le
*Assistant Examiner* — Sonji Johnson
(74) *Attorney, Agent, or Firm* — Griffiths & Seaton PLLC

(57) ABSTRACT

A transaction product assembly includes a transaction product and a supporting backer. The transaction product includes an account identifier, a primary article, and a panel. The account identifier links the transaction product to at least one of an account and a record, and the account identifier is machine readable by a point-of-sale terminal. The primary article defines a substantially planar surface. The panel extends across the substantially planar surface to define a pocket between the panel and the substantially planar surface. The supporting backer is formed separately from the transaction product and includes a flap extending into the pocket to at least partially couple the supporting backer to the transaction product. Other products, assemblies, combinations and associated methods are also disclosed.

24 Claims, 8 Drawing Sheets

U.S. PATENT DOCUMENTS

| | | | | |
|---|---|---|---|---|
| 5,836,095 | A | 11/1998 | Crowell | |
| D439,040 | S | 3/2001 | Vazquez | |
| 6,299,530 | B1 | 10/2001 | Hansted et al. | |
| 6,315,206 | B1 | 11/2001 | Hansen et al. | |
| 6,349,829 | B1 | 2/2002 | Matheis et al. | |
| 6,439,613 | B2 | 8/2002 | Klure | |
| 6,457,649 | B1 | 10/2002 | Hileman | |
| 6,550,617 | B1 | 4/2003 | Elva | |
| 6,619,480 | B2 | 9/2003 | Smith | |
| 6,640,974 | B2 | 11/2003 | Malone | |
| 6,715,795 | B2 | 4/2004 | Klure | |
| 6,832,720 | B2 | 12/2004 | Dawson | |
| 6,957,737 | B1 | 10/2005 | Frederickson et al. | |
| D516,306 | S | 3/2006 | Koenig et al. | |
| 7,219,829 | B2 | 5/2007 | Treat | |
| 7,222,446 | B2 | 5/2007 | Foster | |
| 7,367,504 | B2 | 5/2008 | Lewis et al. | |
| 7,455,222 | B2 | 11/2008 | Beck et al. | |
| 2002/0088855 | A1 | 7/2002 | Hodes | |
| 2002/0100797 | A1 * | 8/2002 | Hollingsworth et al. | 229/92.8 |
| 2002/0143697 | A1 | 10/2002 | Gotfried | |
| 2003/0080013 | A1 | 5/2003 | Smith | |
| 2005/0284718 | A1 | 12/2005 | Tai | |
| 2006/0186196 | A1 * | 8/2006 | Schultz et al. | 235/380 |
| 2006/0289612 | A1 | 12/2006 | Godshaw | |
| 2007/0102460 | A1 | 5/2007 | Lottman | |
| 2007/0138222 | A1 | 6/2007 | Goldman | |
| 2007/0187487 | A1 | 8/2007 | Wilen | |
| 2007/0201772 | A1 | 8/2007 | Schindele | |
| 2007/0262160 | A1 * | 11/2007 | Narlinger et al. | 235/493 |
| 2007/0266605 | A1 | 11/2007 | Halbur et al. | |
| 2007/0267313 | A1 | 11/2007 | McLean | |
| 2008/0109350 | A1 | 5/2008 | Lazarowicz et al. | |
| 2008/0128302 | A1 | 6/2008 | Bohlke et al. | |
| 2008/0140725 | A1 | 6/2008 | Gunn-Beshears et al. | |
| 2008/0230402 | A1 | 9/2008 | Macor | |
| 2008/0237317 | A1 | 10/2008 | Rosendall | |
| 2008/0314777 | A1 | 12/2008 | Foster et al. | |
| 2010/0133128 | A1 * | 6/2010 | Preece | 206/232 |

OTHER PUBLICATIONS

"GO-Tag™ Solution," firstdata.com, 2008, 2 pages.

"Financial Transaction Card Product", U.S. Appl. No. 29/329,677, filed Dec. 19, 2008.

* cited by examiner

TRANSACTION PRODUCT ASSEMBLY WITH POCKET AND SUPPORTING BACKER

BACKGROUND OF THE INVENTION

Stored-value cards and other transaction products come in many forms. A gift card, for example, is a type of transaction product that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction products, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product assembly including a transaction product and a supporting backer. The transaction product includes an account identifier, a primary article, and a panel. The account identifier links the transaction product to at least one of an account and a record, and the account identifier is machine readable by a point-of-sale terminal. The primary article defines a substantially planar surface. The panel extends across the substantially planar surface to define a pocket between the panel and the substantially planar surface. The supporting backer is formed separately from the transaction product and includes a flap extending into the pocket to at least partially couple the supporting backer to the transaction product. Stored-value products, methods of providing a transaction product, and other embodiments of stored-value or transaction products and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

Stored-value cards and other transaction products are adapted for making purchases of goods and/or services at, for example, a retail store or website and/or for storing non-monetary value adapted for redemption toward the use of goods and/or services (e.g., a phone card). According to one embodiment, an original consumer buys a transaction product to give a recipient who in turn is able to use the transaction product at a retail store or setting to pay for the goods and/or services. A transaction product, according to embodiments of the present invention, is coupled to a backer to increase the aesthetic appeal of the resulting assembly, to facilitate placement of transaction product in a retail setting, to provide available areas to supporting additional print regions, and to facilitate wrapping of the transaction product for gifting to a third party recipient.

Figure 1:
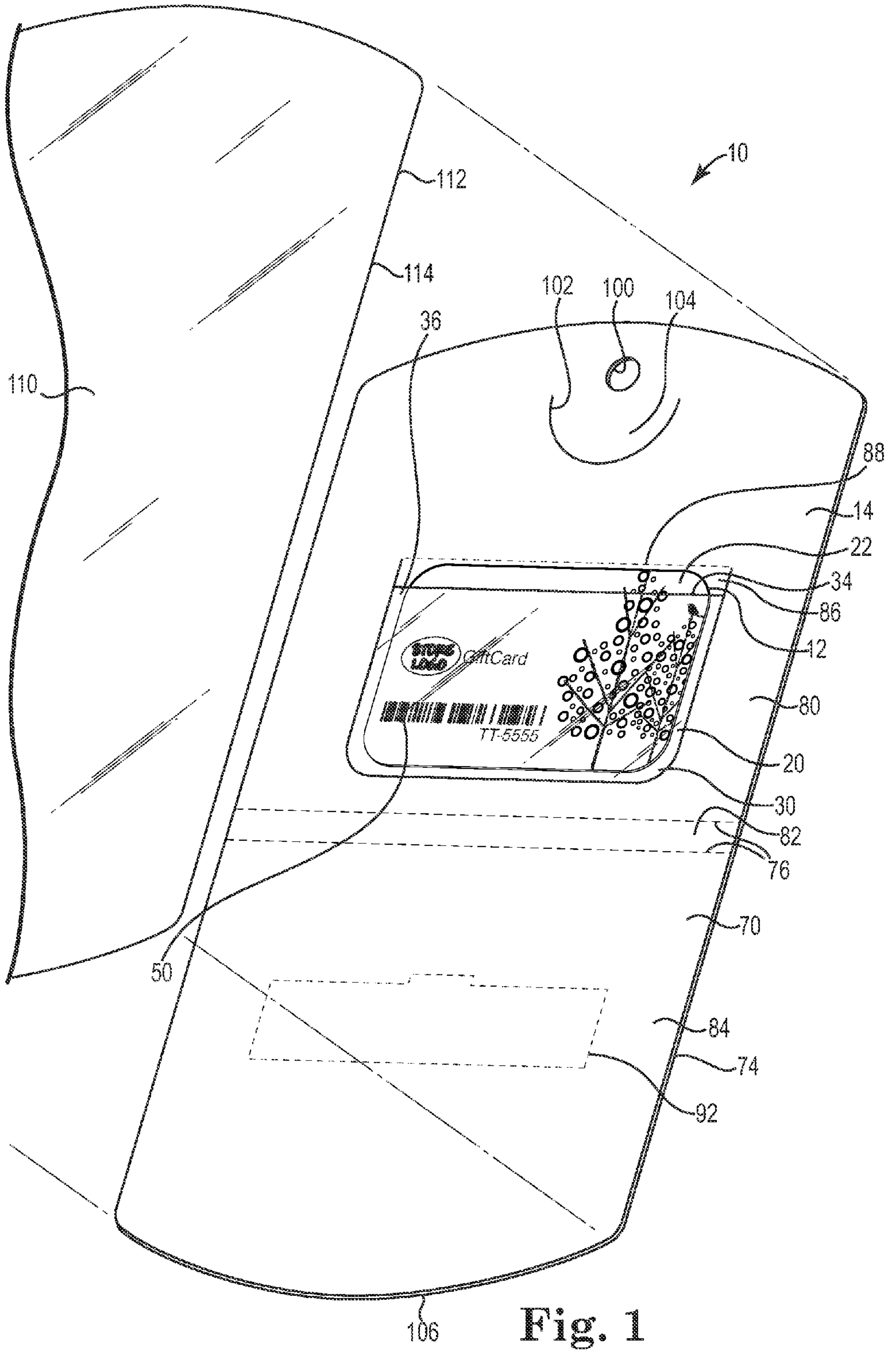
FIG. 1 is a front, perspective view illustration of a transaction product assembly, according to one embodiment of the present invention.
Figure 2:
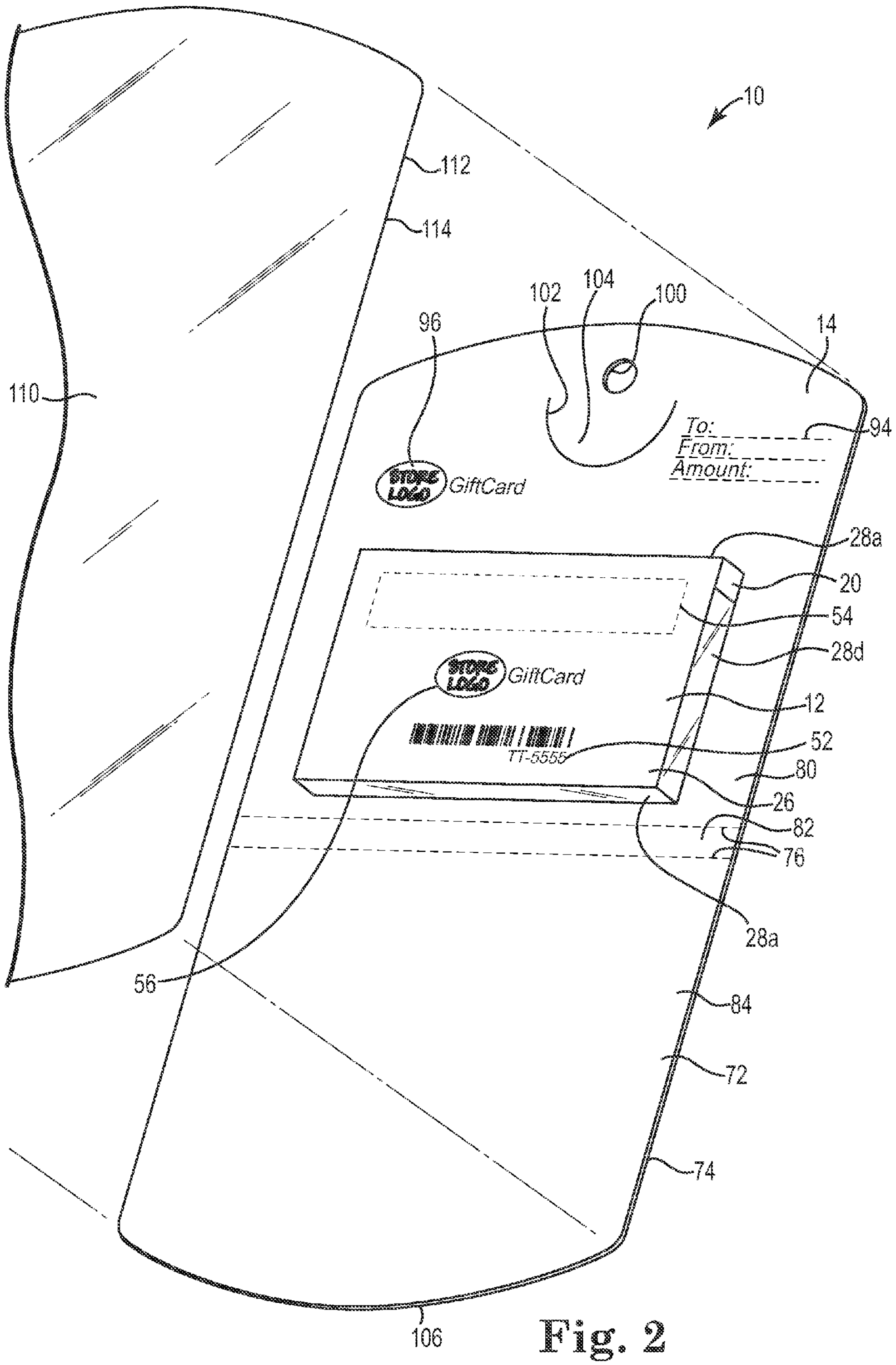
FIG. 2 is a rear, perspective view illustration of the transaction product assembly of FIG. 1, according to one embodiment of the present invention.

FIGS. 1 and 2 illustrate one embodiment of a transaction product assembly 10 including a transaction product 12 and a supporting carrier or backer 14. At least a part of transaction product 12 is configured for use in accessing an account or record having financial or other value to facilitate adding to or deducting from a value balance of the account or record. In addition, transaction product 12 additionally includes a pocket for receiving a portion of the backer 14 to aid in coupling transaction product 12 to backer 14 as will be described in additional detail below.

Figure 3:
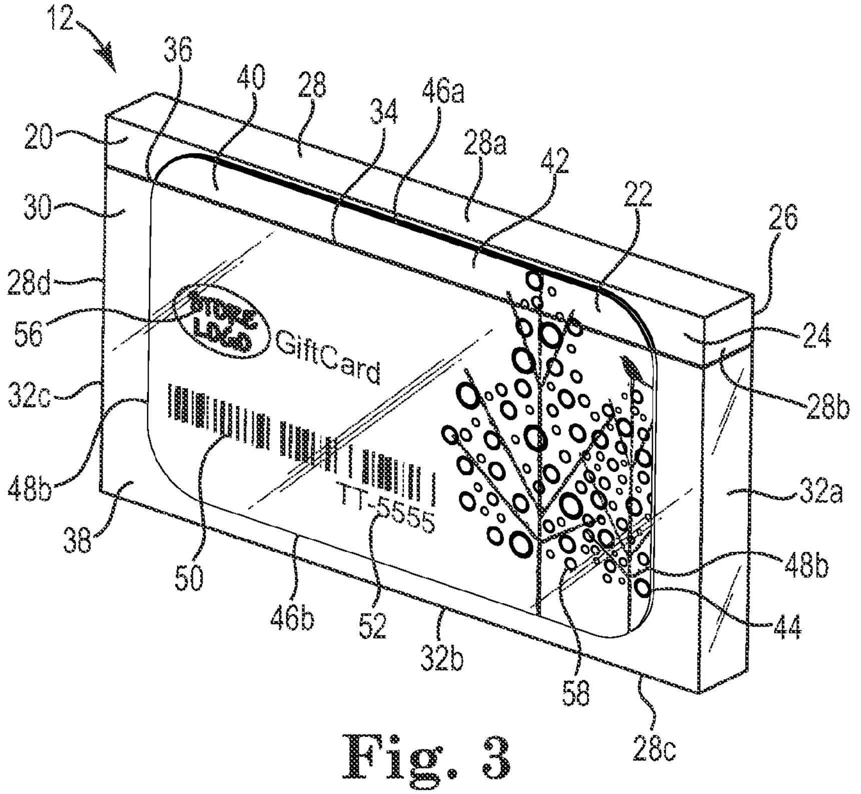
FIG. 3 is front, perspective view illustration of a transaction product of the transaction product assembly of FIG. 1, according to one embodiment of the present invention.

FIG. 3 illustrates one embodiment of transaction product 12 including a primary article 20 and a separate transaction card 22. A pocket 36 is defined along a side of primary article 20 and is configured to receive transaction card 22 and a portion of backer 14. In one embodiment, primary article 20 is any suitable article such as a credit card shaped article. In one example, primary article 20 provides interactive, non-transactional functionality (i.e., functionality unrelated to any value based account or record associated therewith) such as a game (e.g., the game described by U.S. Pat. No. 7,264,155), a folded tote bag (e.g., in the form of the financial transaction card product of U.S. patent application Ser. No. 29/329,677, a sound or light producing item (e.g., as described in any of U.S. Pat. Nos. 7,290,713; 7,290,714; 7,434,735; and 7,376,564) where all of the above-cited patents and applications are incorporated herein by reference, or any other suitable item with at least one generally planar surface. As such, primary article 20 is one example of means for providing non-transaction functionality (e.g., utilitarian or amusing functionality) to transaction product 12. In one example, primary article 20 defines a first or front surface 24 and a second or rear surface 26. In one embodiment, front surface 24 and rear surface 26 are each substantially planar and/or are each sized and shaped similarly to one another. In one example, each of front surface 24 and rear surface 26 are substantially rectangular in shape and are sized similarly to or just slightly larger than a standard credit card.

Primary article 20 defines sidewalls 28 (e.g., first, second, third, and fourth sidewalls **28*a*, 28*b*, 28*c*, and 28*d* as pictured in FIGS. 1-3) collectively extending around and between the respective outer perimeters of front surface 24 and rear surface 26. In one example, each of sidewalls 28 extends a similar distance between front surface 24 and rear surface 26** such that front surface 24 and rear surface 26 extend in substantially parallel planes with respect to one another. In one embodiment, first sidewall 28*a* extends from an end of fourth sidewall 28*d* to an end of second sidewall 28*b*, second sidewall 28*b* extends from an end of first sidewall 28*a* to an end of third sidewall 28*c*, third sidewall 18*c* extends from an end of second sidewall 28*b* opposite first sidewall 28*a* to an end of fourth sidewall 28*d*, and fourth sidewall 28*d* extends between free ends of first sidewall 28*a*. As such, in one example, first and third sidewalls 28*a* and 28*c* are substantially parallel to one another and substantially perpendicular to second and fourth sidewalls 28*b* and 28*d*. In one embodiment, second and fourth sidewalls 28*b* and 28*d* are substantially parallel to one another.

A cover member or panel 30 extends over at least one of front surface 24 and rear surface 26. In one embodiment, panel 30 extends substantially entirely across a length of front surface 24 measured from second sidewall 28*b* to fourth sidewall 28*d*. Panel 30 defines first, second, and third closed sides 32*a*, 32*b*, and 32*c* as well as a top or open side 34 (e.g., closed edges and an open edge). In one example, panel 30 extends at least partially over each of second and fourth sidewalls 28*b* and 28*d* and/or is secured to each of second and fourth sidewalls 28*b* and 28*d* along first and third closed sides 32*a* and 32*c* of panel 30. Panel 30, more specifically, second closed side 32*b*, is secured along bottom or third sidewall 28*c* of primary article 20. For example, in one instance, panel 30 terminates at or otherwise near the intersection between front surface 24 and third sidewall 28*c*, while, in one example, panel 30 extends at least partially over and is secured to third sidewall 28*c*. Open side 34 defined by panel 30 extends from near third sidewall 28*c* toward top or first sidewall 28*a* of primary article 20. In one embodiment, panel 30 extends entirely to first sidewall 28*a*. In the example illustrated in FIG. 3, for instance, panel 30 extends from third sidewall 28*c* towards but short of first sidewall 28*a*. As such, in the illustrated embodiment, open side 34 of panel 30 is spaced from first sidewall 28*a* leaving an upper portion of front surface 24 uncovered by panel 30.

A pocket 36 (e.g., a sleeve or compartment) is defined between panel 30 and front surface 24, in other words, opposite a substantially planar, outside surface 38 of panel 30. As such, primary article 20 and panel 30 are one example of means for defining pocket 36, and panel 40 is one example of means for extending over primary article 20 to define pocket 36. Pocket 36 is sized and shaped to extend over substantially all of front surface 24 of primary article 20 other than the upper portion of front surface 24 uncovered by panel 30 as described above. In one embodiment, panel 30 contacts front surface 24 upon initial construction of primary article 20 and/or pocket 36 is otherwise formed to be very thin. In one example, panel 30 is formed of a material configured to stretch slightly upon insertion of planar item(s) into pocket 36 to allow room to receive the planar item(s) while maintaining compression on the planar item(s) between front surface 24 and panel 30. Panel 30 and primary article 20, therefore, provide one example of means for maintaining item(s) within pocket 36 in compression. The material used for panel 30 is, in one embodiment, transparent or translucent.

Transaction card 22 may take any one of a variety of forms as are known in the art, and, in one example, is formed separately from primary article 20. In one embodiment, transaction card 22 is formed of a suitable substrate 40 formed from a single or multiple layered sheet material. Example substrates 40 are somewhat rigid yet flexible materials in substantially planar forms. More specifically, in one embodiment, substrate 40 is a substantially planar member formed of plastic (e.g. polycarbonate, polystyrene, polyvinyl chloride (PVC), acrylonitrile butadiene styrene (ABS), polyethylene terephthalate (PET), teslin, polyactide (PLA) or acrylic), or a composite thereof. Substrate 40 can be formed in any other suitable planar or non-planar configuration as will be apparent to those of skill in the art upon reading this application.

In one example, substrate 40 defines a front surface 42 (i.e., a first major surface) and a rear surface 44 (i.e., a second major surface) opposite front surface 42 separated by a thickness of transaction card 22. In one embodiment, at least one of front and rear surfaces 42 and 44 is substantially planar. In one example, substrate 40 is substantially rectangular in shape, and, in one embodiment, is sized similarly to an identification card, a credit card, or other card sized to fit in a wallet of a card bearer (i.e. is wallet sized). Accordingly, in one example, each of front surface 42 and rear surface 44 is substantially rectangular and/or is otherwise wallet sized. In particular, in one embodiment, the overall dimensions of substrate 40 are about 8.5 cm by about 5.5 cm wide with a thickness of less than about 1 mm. In other embodiments, substrate 40 is otherwise shaped as a square, circle, oval, star, or any other suitable shape.

In one example, substrate 40 defines a top edge 46*a*, an opposite, bottom edge 46, and two opposing side edges 48*a* and 48*b* each extending between and substantially perpendicularly to top edge 46*a* and bottom edge 46*b*. Substrate 40 is sized and shaped to fit within pocket 36 defined between front surface 24 of primary article 20 and panel 30. An overall width of substrate 40 (i.e., a distance measured between opposing side edges 48*a* and 48*b*) is slightly smaller than a width of pocket 36 (i.e., a distance between first and third closed sides 32*a* and 32*c*). In one embodiment, substrate 40 defines an overall height (i.e., distance between top edge 46*a* and bottom edge 46*b*) that is greater than an overall height of pocket 36 (i.e., a distance defined between closed side 32*b* and open side 34 of panel 30) such that top edge 46*a* extends above and is spaced from open side 34 of panel 30.

Transaction card 22 is configured to be slid into pocket 36 through an opening defined between open side 34 of panel 30 and front surface 24 of primary article 20 in a relatively tight manner such that transaction card 22 is at least partially maintained in pocket 36 by compression applied to either side of transaction card 22 by panel 30 and primary article 20.

In one example, front surface 42 of substrate 40 or any other suitable portion of transaction card 22, includes at least one account activation area or account identifier 50 fixedly connected thereto, such as a bar code, magnetic strip, a smart chip or other electronic device, a radio frequency identification (RFID) device or other suitable identifier readily machine readable by a point-of-sale terminal or other account access station or kiosk. Account identifier 50 indicates an account or record to which transaction card 22, and therefore, transaction product 12 considered as a whole, is linked. The account or record of the monetary or other value balance on transaction product 12 optionally is maintained on a database, other electronic or manual record-keeping system or, in the case of "smart" cards for example, on a chip or other electronic device(s) on transaction card 22 or other portion of transaction product 20. Accordingly, by scanning account identifier 50, the account or record linked to transaction product 12 is identified and can subsequently be activated, have amounts debited therefrom, and/or have amounts added thereto.

In one embodiment, account identifier 50 includes a character string or code 52 (e.g., a number and/or letter string) configured to provide additional security to the user of transaction product 22 and/or configured to be read by a bearer of transaction card 22 to facilitate use of transaction card 22 for web site or other purchases outside of brick-and-mortar type retail establishments. With the above in mind, account identifier 50 is one example of means for linking transaction card 22 and, therefore, transaction product 12, with an account or record, and scanning of account identifier 50 is one example of means for activating or loading value on transaction card 22 and transaction product 12. In one embodiment, account identifier 50 is alternatively or additionally also fixedly connected to primary article 20, as illustrated, for example, in FIG. 2.

In one embodiment, front surface 42 of substrate 40 or other suitable portion of transaction card 22 includes one or more brand identifier 56 and/or other indicia 58. Brand identifier 56 includes one or more of a logo, text, trademark, etc. associating transaction product 12 with at least one of a product, a brand, a store, etc. Other indicia 58 may include any suitable graphics, text, or combinations thereof. In one example, other indicia 58 include aesthetically pleasing graphics, etc., an indication of a place for a user or retail employee to write an initial value of transaction card 22 (i.e., value of the account or record linked to transaction card 22), or any other suitable indicia.

When transaction card 22 is slid into pocket 36, rear surface 44 of transaction card 22 is positioned adjacent front surface 24 of primary article 29. In one embodiment, due to the substantially transparent nature of panel 30, front surface 24 faces and is at least partially viewable, scannable, or otherwise readable through panel 30. For example, account identifier 50 on front surface 24 is able to be viewed by the bearer and/or an employee of a retail store and/or is mechanically scannable (e.g., optically scannable in the case of a bar code) through panel 30 such that transaction card 22 does not necessarily need to be removed from pocket 36 to use transaction card 22 to identify the account or record associated with transaction card 22. In one embodiment, primary article 20 alternatively or additionally includes one or more of indicia 50, 52, 56, and 58.

In one embodiment, redemption indicia 54 are included on one or both of primary article 20 and transaction card 22 (see, e.g., FIG. 2) such as on rear surface 26 of primary article 20 or on rear surface 44 of substrate 40. Redemption indicia 54 indicate that transaction card 22 is redeemable for the purchase of goods and/or services and that, upon use, a value of the purchased goods and/or services will be deducted from the account or record linked to transaction card 22. In one embodiment, redemption indicia 54 include phrases such as "<NAME OF STORE> GiftCard" and "This GiftCard is redeemable for merchandise or services at any of our stores or at our web site," and/or provides help or phone line information in the case of a lost, stolen, or damaged transaction card, etc.

Figure 4:
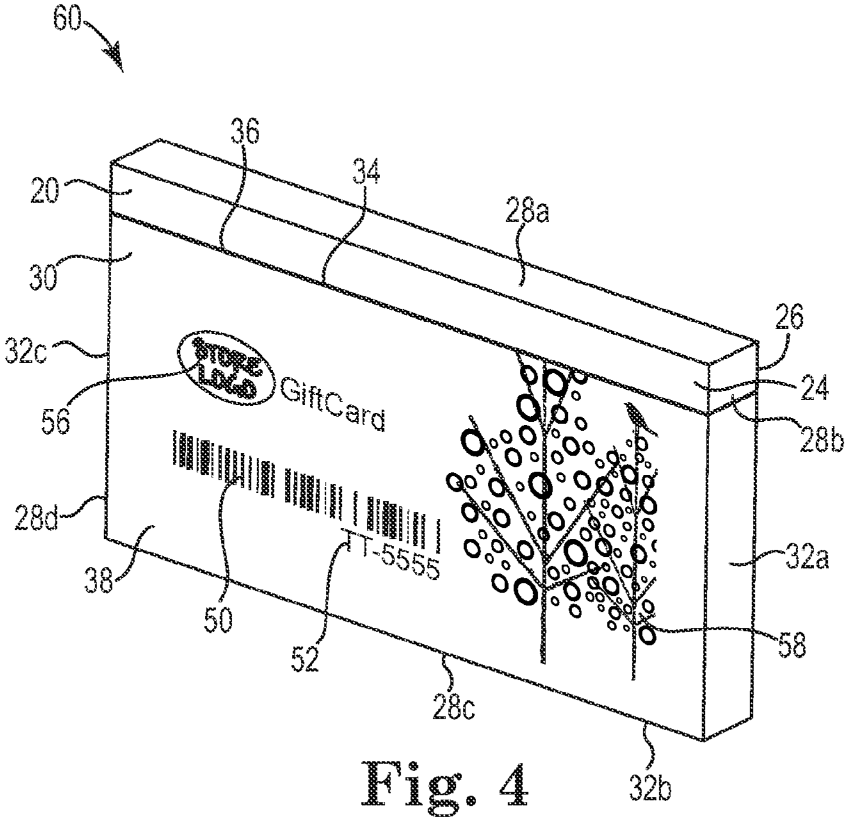
FIG. 4 is a front, perspective view illustration of a transaction product, according to one embodiment of the present invention.

FIG. 4 illustrates one embodiment of a transaction product 60, which is an alternative to transaction product 12 and is substantially identical to transaction product 12 except where specifically enumerated herein. Transaction product 60 includes primary article 20 and panel 30 attached thereto to define a pocket 36. However, account identifier 50 (e.g., with code 52), brand identifier 56, and/or other indicia 58 are each printed directly to outside surface 38 of panel 30 and separate transaction card 22 or may be eliminated. In one example, when account identifier 50 is printed to outside surface 38 of panel 30, panel 30 is substantially opaque. While the present innovation is primarily described herein as including transaction product 12, it should be understood to those of skill in the art that transaction product 60 and/or other similar, suitable transaction products may be substituted for one another.

Figure 5:
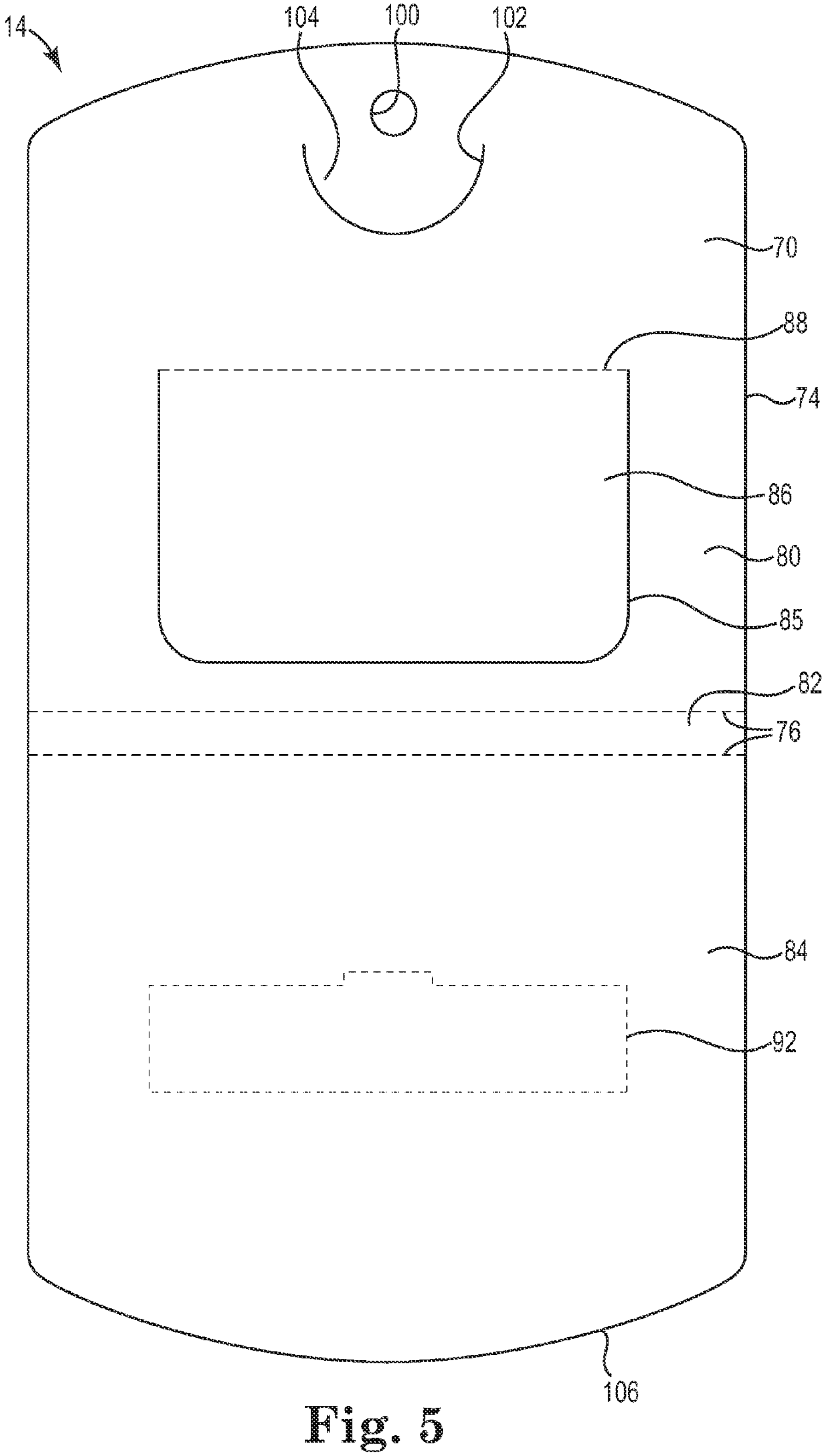
FIG. 5 is a front view illustration of a backer of the transaction product assembly of FIG. 1 in an unfolded position, according to one embodiment of the present invention.

FIG. 5 illustrates a front view of carrier or backer 14 configured to support primary article 20 (i.e., means for supporting transaction product 12; see, e.g., FIGS. 1 and 2). Backer 14 comprises a single layer or multiple layers of paper, cardboard, and/or plastic material, for example, generally in the form of a relatively stiff but bendable/flexible card. Use of other materials to form backer 14 is also contemplated. Backer 14 defines a first or front surface 70 (FIGS. 1 and 5), a second or rear surface 72 (FIG. 2) opposite front surface 70, and an outer perimeter edge 74. Transaction product 12 (FIGS. 1 and 2) is coupled with backer 14 to collectively define transaction product assembly 10.

Figure 6:
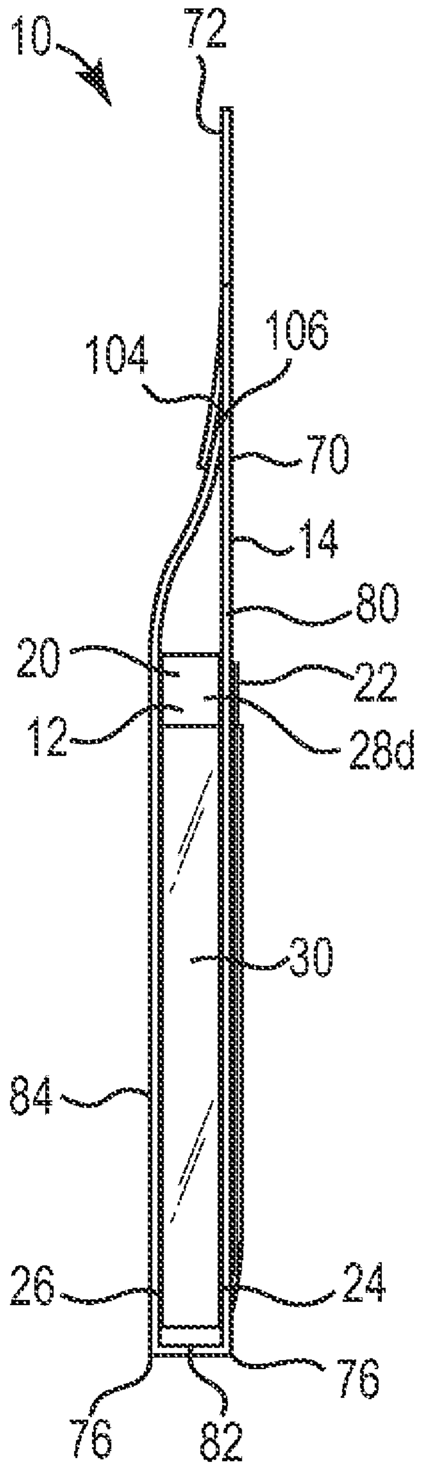
FIG. 6 is a left side view illustration of the transaction product assembly of FIG. 1 with the backer in a folded position, according to one embodiment of the present invention.

In one embodiment, backer 14 is configured to be folded about transaction product 12 to wrap transaction product 12 for presentation to a recipient. For example, in one embodiment, backer 14 includes fold lines 76 (e.g., predefined fold lines), which extend substantially parallel to and are longitudinally spaced from one another to define a first panel 80, an intermediate or second panel 82, and a third panel 84 of backer 14. For example, second panel 82 extends between first panel 80 and third panel 84. One of fold lines 76 divides first panel 80 from second panel 82, and the other one of fold lines 76 divides second panel 82 from third panel 84. In one embodiment, transaction product 12 is secured to first panel 80 such that, upon folding backer 14 about fold lines 76, first panel 80 and third panel 84 are folded relative to second panel 82 to at least partially overlap one another and to substantially enclose transaction product 12 within folded backer 14, for example, as generally illustrated in FIG. 6.

In one example, a cut 85 is formed in an internal portion (i.e., a portion spaced from outer perimeter edge 74) of backer 14, more specifically, in an internal portion of first panel 80 of backer 14. Cut 85 is substantially three-sided to define a flap 86 between the sides or segments of cut 85. In one embodiment, cut 85 is substantially U-shaped, although any one or more of sides of cut 85 may be substantially linear or nonlinear as will be apparent to those of skill in the art. Cut 85 is sized and shaped to define flap 86 with an overall width at least slightly less than a width of pocket 36 of transaction product 12. In one embodiment, cut 85 is a single slit of nominal thickness in backer 14. In one embodiment, cut 85 is a single slit in backer 14. In one embodiment, cut 85 is alternatively formed as a substantially wider cutout in backer 14. Flap 86 is one example of means for extending from a remainder of backer 14.

A fold line 88 generally extends between the opposing ends of cut 85 as generally illustrated in FIGS. 1, 2, and 5. In one embodiment, fold line 88 is indicated in FIG. 4 for illustrative purposes and is not predetermined, creased, or otherwise defined by backer 14; instead, fold line 88 indicates a general line about which flap 86 can be rotated or bent away from a remainder of first panel 80. In one embodiment fold line 88 is defined substantially parallel to fold lines 76 and is substantially positioned further away from fold lines 76 than cut 85.

In one example, first panel 80 defines a hanging aperture 100 near a top portion thereof as illustrated in FIGS. 1, 2, and 5 (i.e., near an end of first panel 80 opposite fold lines 76). Hanging aperture 100 is configured to receive a support arm or hook, such that transaction product assembly 10 can be hung from a rail or rack within a retail setting or elsewhere to facilitate display of transaction product assembly 10. According to one embodiment, FIG. 1 illustrates surfaces of backer 14 that will be supported on a rack or other fixture while FIG. 2 illustrates surfaces of backer 14 that will be visible to a consumer of a retail store who is considering the purchase of transaction product assembly 10. The opposite configuration (i.e., where the surfaces of backer 14 illustrated in FIG. 1 will be visible and the surfaces of backer 4 illustrated in FIG. 2 will be supported on a rack or other fixture when transaction product assembly 10 is positioned for retail sale) is also contemplated.

In one embodiment, backer 14 defines a slit 102 and a corresponding tab 104 formed by slit 102. Tab 104 is formed in an interior portion within the confines of slit 102. Tab 104 is configured to be bent or moved slightly away from a remainder of first panel 80. More specifically, one of first panel 80 and third panel 84 defines slit 102 and tab 104 such that tab 104 is configured to receive an opposite edge 106 defined by the other of first panel 80 and third panel 84. In this configuration, when backer 14 is folded about fold lines 76, opposite edge 106 is placed through slit 102 such that opposite edge 106 is maintained between tab 104 and a remainder of first panel 80 adjacent slit 102 to selectively hold backer 14 in the folded or closed configuration, for example, as illustrated in FIG. 6. Other methods of folding backer 14 and/or maintaining backer 14 in a folded configuration will be apparent to those of skill in the art upon reading this application. In one embodiment, a non-foldable backer may be used as an alternative to or in addition to backer 14.

In one embodiment, backer 14 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 70 and 72. In one example, the indicia include one or more of redemption indicia 92, message field indicia 94, brand indicia 96, etc.

Redemption indicia 92, which are generally indicated with a dashed box in FIGS. 1 and 5, indicate that transaction product assembly 10 or at least portions thereof are redeemable for the purchase of goods and/or services and that upon use, a value of the purchased goods and/or services will be deducted from the account or record linked to transaction product assembly 10. In one embodiment, redemption indicia 92 include phrases such as "<NAME OF STORE> GiftCard" and "This GiftCard is redeemable for merchandise or services at any of our stores or at our website," and/or provides help or phone line information in case of a lost, stolen, or damaged transaction product assembly 10, etc.

Message field indicia 94 (FIG. 2), for example, including "to," "from" and "amount" fields, are configured to be written to by the bearer of transaction product assembly 10 prior to presenting transaction product assembly 10 to an end recipient. As such, message field indicia 94 facilitate the consumer in preparing transaction product assembly 10 for gifting to a recipient. Brand indicia 96 identify a store, brand, department, etc. and/or services associated with transaction product 12 and/or transaction product assembly 10 as a whole. Any suitable decorative indicia may also be included on backer 14. Any of indicia 54, 56, 58, 92, 94, 96, or other indicia optionally may appear anywhere on backer 14 or transaction product 12. Additional information besides that specifically described and illustrated herein may also be included.

Figure 7:
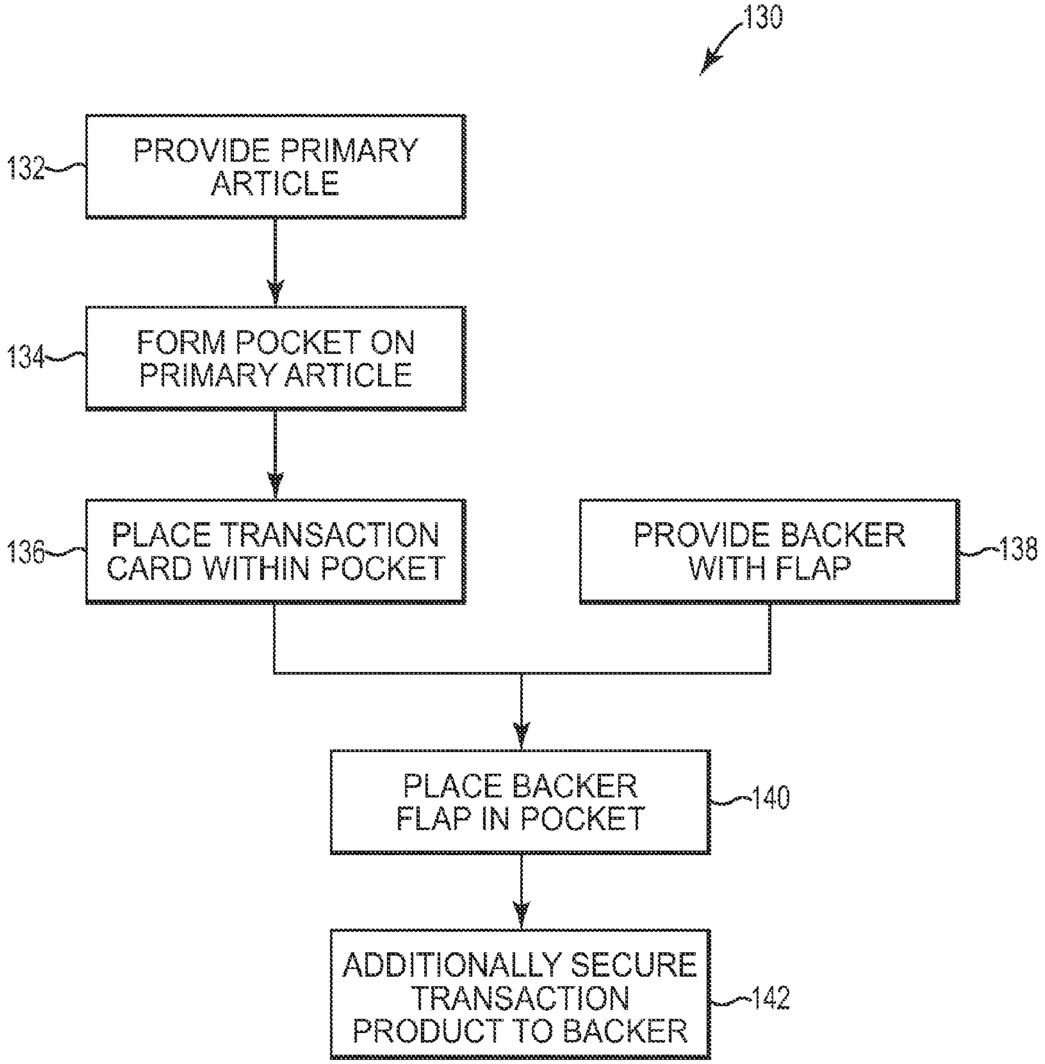
FIG. 7 is a flow chart illustration of a method of assembling of a transaction product assembly, according to one embodiment of the present invention.

FIG. 7 is a flow chart illustrating a method of assembling transaction product assembly 10 as generally indicated at 130. At 132, a primary article 20 of any of the varieties described above is provided. At 134, a panel 30 is coupled with primary article 20. For example, panel 30 is coupled to or near each of sidewalls 28*b*, 28*c*, and 28*d* of primary article 20. Panel 30 may be coupled using any suitable method as will be apparent to those of skill in the art. For example, where primary article 20 is at least partially fabric based, panel 30 may be sewn thereto. In one embodiment, panel 30 is coupled with primary article 20 using adhesive, ultrasonic welding, etc. or any combinations thereof.

At 136, transaction card 22 is placed in pocket 36 by sliding transaction card 22 into pocket 36 via an opening defined between open side 34 of panel 30 and front surface 24. Once positioned within pocket 36, even where bottom edge 46*b* of transaction card 22 is positioned nearly adjacent bottom or third sidewall 28*c* of primary article 20, a top portion of transaction card 22 remains exposed between open side 34 of panel 30 and first sidewall 28*a* of primary article 20 when viewed from a front vantage point. The exposed portion of transaction card 22 facilitates a user in easily grasping transaction card 22 to repeatedly and slidably remove transaction card 22 from and to replace transaction card 22 in pocket 36 as desired.

In one example, panel 30 is initially tightly held against front surface 24 of primary article 20, but is formed of a slightly elastic or otherwise stretchable material that allows panel 30 to stretch slightly away from front surface 24 in a manner forming pocket 36 and receiving transaction card 22. Upon positioning, transaction card 22 is maintained within pocket 36 via compression applied on either side by primary article 20 and panel 30. In one embodiment, such as that illustrated in FIG. 4 wherein a transaction product 60 is provided as an alternative to transaction product 12, transaction card 22 is eliminated and, therefore, so is operation 136. Notably, in one embodiment, front surface 24 has larger overall dimensions than transaction card 22 such that transaction card 22 is generally maintained within the outer dimensions of the front surface 22 (i.e., transaction card 22 does not extend beyond the outer dimensions of front surface 24) when transaction card 22 is positioned within pocket 36.

At 138, which may occur before, after, or substantially simultaneously with any one or more of operations 132, 134, and 136, backer 14 is provided. In one example, backer 14 is cut from a piece of substantially planar material that is one or more of paper, cardboard, and plastic based to have features similar to those described above. Then, at 140, transaction product 12 (or 60) is coupled with backer 14. In particular, flap 86 of backer 14 is slid into pocket 36 via the same opening into pocket 36 as transaction card 22. For example, where transaction product 12 is used, flap 86 is positioned in pocket 36 between transaction card 22 and front surface 24 of primary article 20. In one embodiment, flap 86 flexes away from a remainder of first panel 80 of backer 14 about fold line 88 to facilitate placement of flap 86 within pocket 36.

In one example, panel 30 is formed of a slightly elastic or otherwise stretchable material that allows panel 30 to stretch slightly away from front surface 24 to form pocket 36 and receiving transaction card 22 and/or flap 86. The tight pocket 36 at least partially maintains transaction card 22 and/or flap 86 within pocket 36 via compression applied on either side by primary article 20 and panel 30. Referring to FIG. 1, by placing flap 86 between transaction card 22 and primary article 20, account identifier 50 of transaction card 22 is maintained in a position allowing account identifier 50 to be continually be viewed and/or otherwise mechanically scanned through substantially translucent or transparent panel 30.

At 142, transaction product 12 is optionally additionally secured to backer 14. For example, as illustrated in FIGS. 1 and 2, in one embodiment, a translucent or transparent skinning material 110 is adhered or otherwise applied over front surface 70 of backer 14, a portion of first surface 42 of transaction card 22, and outside surface 38 of panel 30 (FIG. 1), and/or a separate piece of skinning material 110 adhered to or otherwise applied over rear surface 72 of backer 14 and rear surface 26 of primary article 20 (FIG. 2). In one embodiment, no skinning material 110 is used on front surface 70 of backer 14, but instead a sticker or tape piece (not shown) is placed to extend over a portion of each of front surface 70 of backer 14 and one or both of transaction card 22 and panel 30. In one embodiment, no skinning material 110 is used on rear surface 72 of backer 14, but instead a sticker or tape piece (not shown) is placed to extend over a portion of each of rear surface 72 of backer 14 and one or both of transaction card 22 and panel 30.

Other embodiments and/or variations of transaction product assembly 10 will be apparent to those of skill in the art upon reading this application. For example, transaction product 60 may include a transaction card 22, hanging aperture 100 may be positioned near an end of third panel 84 rather than first panel 80, etc. In one embodiment, where the overall thickness from front to back of transaction product 12 or 60 is relatively small, fold lines 76 of backer 14 is replaced with a single fold line 76 and intermediate or second panel 82 is eliminated.

Figure 8:
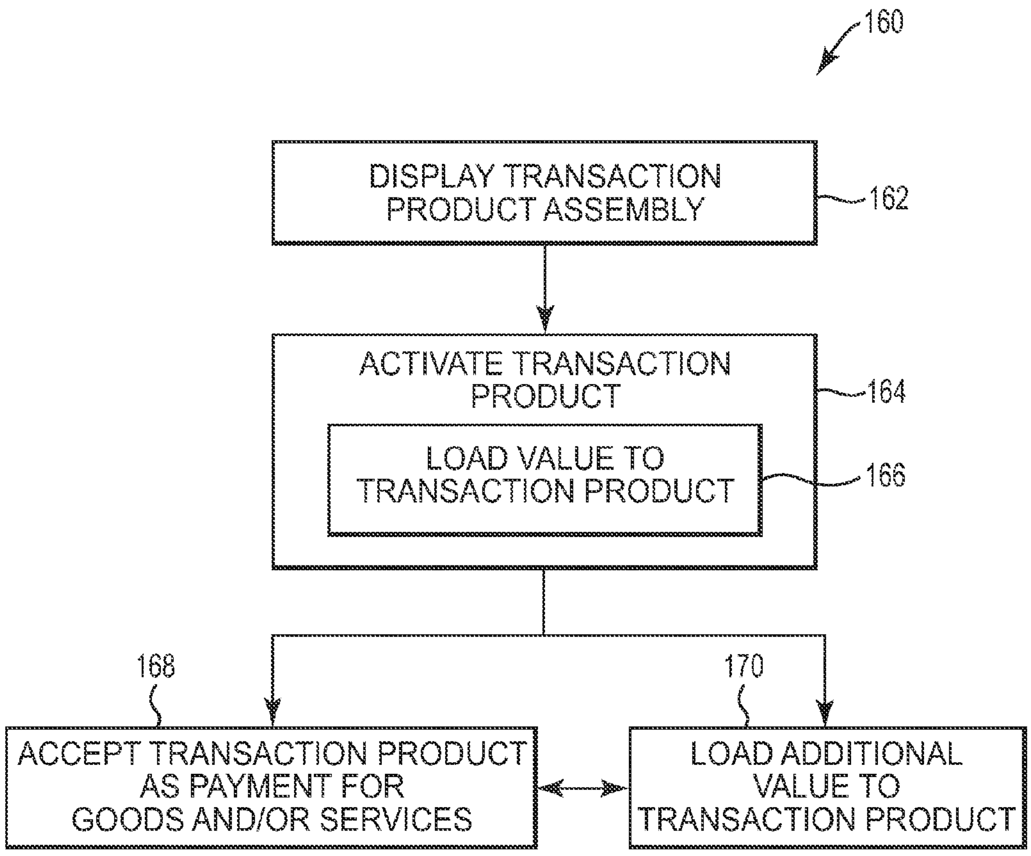
FIG. 8 is a flow chart illustration of a method of providing and supporting use of a transaction product assembly, according to one embodiment of the present invention.

FIG. 8 is a flow chart illustrating one embodiment of a method 160 of encouraging purchase and facilitating use of transaction product 12 (or alternatively transaction product 60, etc.) by consumers and/or recipients. At 162, transaction product assembly 10 including transaction product 12 is placed on or hung from a rack, shelf, or other similar device to display transaction product assembly 10 for sale to potential consumers. In one embodiment, transaction product assembly 10 is presented to potential consumers on a retail display such that potential consumers are able to take transaction product assembly 10 and interact with any non-transaction features (e.g., the games, audio, video, light, and/or any other features) of primary article 20 prior to purchasing or otherwise activating transaction card 22 or any other portion of transaction product 12. Allowing such interaction with transaction product 12 prior to purchase of transaction product 12, promotes sale of transaction products 12. In one embodiment, a depiction of transaction product assembly 10 is additionally or alternatively placed on a website for viewing and purchase by potential consumers.

At 164, a consumer who has decided to purchase transaction product assembly 10 presents transaction product 12 on backer 14 to a retail store employee, retail store kiosk, remote terminal, or other person or device to scan account identifier 50 to access an account or record linked to account identifier 50. In particular, account identifier 50 is scanned or otherwise accessed, for example, while in pocket 36 through panel 30 to activate transaction card 22 or transaction product 12 or 60 as a whole. Upon accessing the account or record, then, at 166, value is added to the account or record in the form of monetary value, points, minutes, etc. Thus, transaction card 22 and/or transaction product 12 as a whole is activated and loaded.

In one example, a predetermined value is associated with transaction product 12 (i.e., associated with the account or record linked to transaction product 12 via account identifier 50) prior to activation and display, but such predetermined value is not initially available for use toward the purchase or use of goods and/or services. In such an embodiment, at 164, transaction product 12 is activated to permit subsequent access to the predetermined value (e.g., subsequent loading on and debiting from the account or record) and no additional value is added during activation such that operation 166 may be eliminated.

Once transaction product 12 is activated and loaded, transaction product 12, and in one example, transaction card 22 removed from a remainder of transaction product 12, can be used by the consumer or any other bearer of transaction product 12 to purchase goods and/or services at the affiliated retail setting (e.g., a retail store or website) or can be used in exchange for calling minutes, etc. In one embodiment, where transaction product assembly 10 is displayed on a website at 162, then, at 164, transaction product 12 may be activated in any suitable method and may not require the physical scanning of account identifier 50 to be activated or to otherwise access the associated account or record such as at 166.

In one example, at 168, the retail store or other affiliated retail setting or website accepts at least a portion of transaction product 12 (e.g., transaction card 22) as payment toward the purchase of goods and/or services made by the current bearer of transaction product 12. In particular, the value currently loaded on transaction product 12 (i.e., stored or recorded in the account or record linked to account identifier 50) is applied toward the purchase of goods and/or services. At 170, additional value is optionally loaded on transaction product 12 at a point-of-sale terminal, kiosk or other area of the retail store or related setting. Upon accepting transaction product 12 or a portion thereof as payment at 168, the retail store or related setting can subsequently perform either operation 168 or operation 170 as requested by a current bearer of transaction product 12. Similarly, upon loading additional value on transaction product 12 at 170, the retail store or related setting can subsequently perform either operation 170 again or operation 168. In one example, the ability to accept transaction card 22 as payment for goods and/or services is limited by whether the account or record associated with transaction card 22 has any value stored or recorded therein at the time of attempted redemption.

Figure 9:
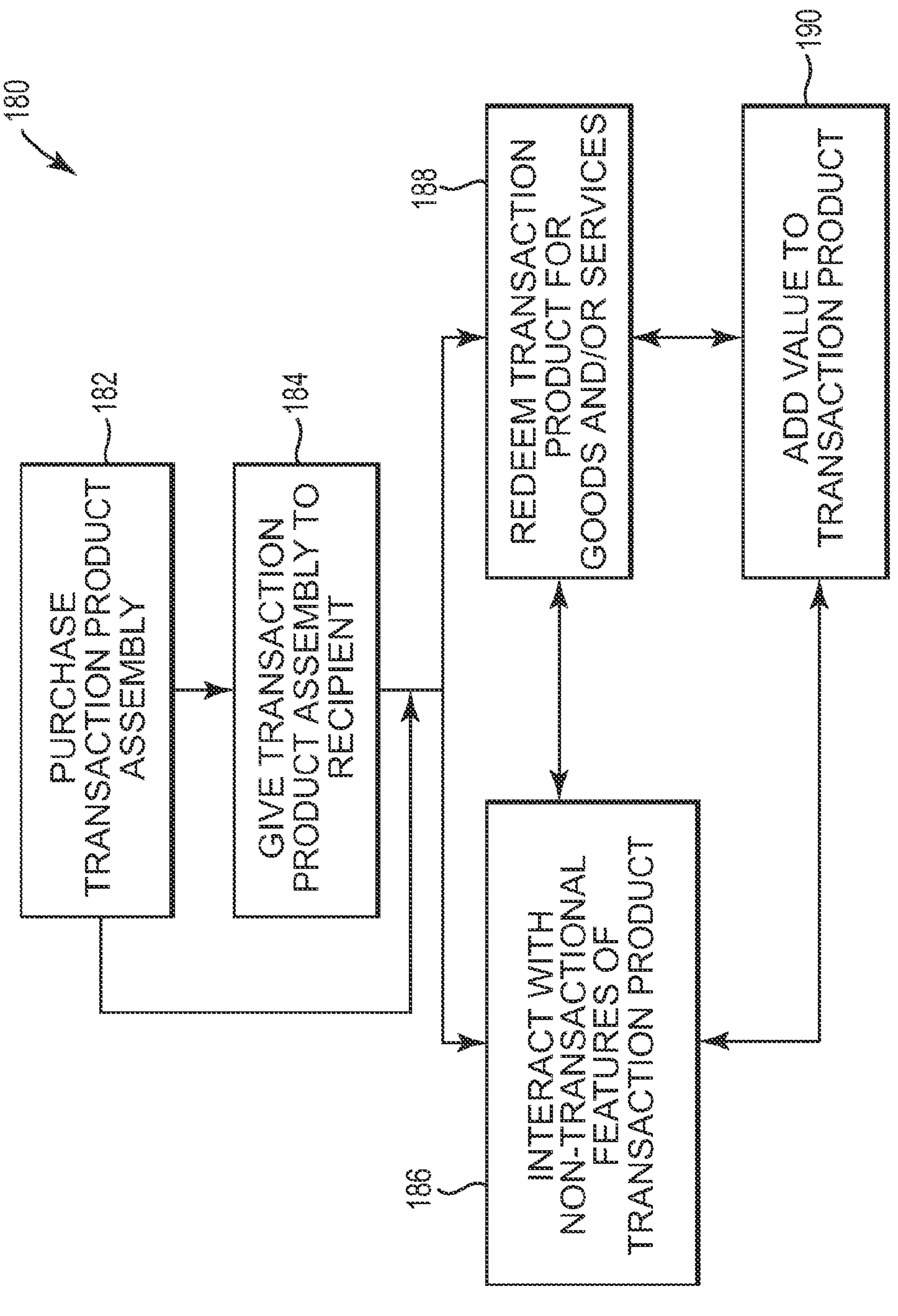
FIG. 9 is a flow chart illustration of a method of using a transaction product assembly, according to one embodiment of the present invention.

FIG. 9 is a flow chart illustrating one embodiment of a method 180 of using transaction product 12 (e.g., FIGS. 1-3). At 182, a potential consumer of transaction product 12, which is displayed in a retail store or viewed on a website, decides to and does purchase transaction product 12 coupled with backer 14 in the form of transaction product assembly 10 from the retail store or website. As used herein, “purchase” may refer to paying a fee to buy transaction product 12 and/or merely paying an amount equal to the value in or being added to the associated account or record without an additional fee for activation and/or primary article 20. During the purchase of transaction product 12, a retail store employee, a retail store kiosk or other person or device scans account identifier 50 of transaction card 22, for example, through translucent or transparent panel 30, or otherwise reads or accesses account identifier 50. Where account identifier 50 is included directly on primary article 20, account identifier 50 may additionally or alternatively be read directly from primary article 20.

Upon accessing account identifier 50, the account or record linked to account identifier 50 is accessed and activated to load value onto transaction product 12 (i.e., load value to the account or record associated with transaction product 12, for example, via transaction card 22). In one embodiment, such as where transaction product 12 is purchased at 182 via a website, actual scanning or other mechanical detection of account identifier 50 may be eliminated.

At 184, the consumer optionally gives transaction product 12 to a recipient, such as a graduate, relative, friend, expectant parents, one having a recent or impending birthday, a couple having a recent or impending anniversary, etc. In one embodiment, a plurality of transaction products 12 are purchased and given to partygoers, such as at a birthday party, etc. as party favors or gifts. As an alternative, the consumer can keep transaction product 12 for his or her own use thereby eliminating operation 184.

At 186, the consumer, recipient, or other current bearer of transaction product 12 interacts with the non-transactional features thereof for amusement. More specifically, the bearer of transaction product 12 interacts with any amusing or otherwise functional aspects of primary article 20 as described above that are not related to financial or value-based transactions. At 188, the consumer or recipient redeems transaction product 12 for goods and/or services from the retail store or website. At 190, the consumer or recipient of transaction product 12 optionally adds value to transaction product 12, more particularly, to the account or record associated with account identifier 50 included therewith, at the retail store or over the Internet (i.e., via the website).

Upon interacting with the non-transactional feature(s) of transaction product 12 at 186, redeeming transaction card 22 or transaction product 12 at 188 or adding value to transaction card 22 or transaction product 12 at 190, the consumer or recipient of transaction product 12 subsequently can perform any of operations 186, 188, or 190 as desired. In one embodiment, the ability of the consumer or recipient to repeat redeeming transaction product 12 or any portion thereof at 188 is limited by whether the account or record linked with transaction product 12 has any remaining value stored or recorded therein at the time of attempted redemption.

Although described above as occurring at a single retail store or website, in one embodiment, purchasing transaction product 12 at 182, redeeming transaction product 12 at 188, and adding value to transaction product 12 at 190, can each be performed at any one of a number of stores adapted to accept transaction product 12 or over the Internet. In one example, a number of stores are each part of a chain or are similarly branded stores. In one example, a number of stores includes at least one website and/or at least one conventional brick and mortar store.

Transaction cards and products come in many forms, according to embodiments of the invention. Stored-value cards, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The value balance associated with the transaction product declines as the product is used, encouraging repeat visits or use. The transaction product remains in the user's purse or wallet, serving as an advertisement or a reminder to revisit the associated merchant. Stored-value cards and other products according to embodiments of the invention provide a number of advantages to both the consumer and the merchant. Other stored-value products and transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction product assembly comprising:
a transaction product including:
an account identifier linking the transaction product to at least one of an account and a record, wherein the account identifier is machine readable by a point-of-sale terminal,
a primary article defining a substantially planar surface, and
a panel extending across the substantially planar surface to define a pocket between the panel and the substantially planar surface; and
a supporting backer formed separately from the transaction product, wherein the supporting backer includes a flap extending into the pocket to at least partially couple the supporting backer to the transaction product.

2. The transaction product assembly of claim 1, wherein the account identifier is a bar code.

3. The transaction product assembly of claim 1, wherein the account identifier includes at least one of a bar code, a magnetic strip, a smart chip, and a radio frequency identification (RFID) device.

4. The transaction product assembly of claim 1, wherein the account identifier is fixedly connected to at least one of the panel and the primary article.

5. The transaction product assembly of claim 4, wherein the account identifier is fixedly connected to the panel.

6. The transaction product assembly of claim 1, wherein the transaction product includes:
a transaction card formed separately from the primary article, wherein the account identifier is fixedly connected with the transaction card, and the transaction card is positioned within the pocket.

7. The transaction product assembly of claim 6, wherein the flap is positioned within the pocket between the transaction card and the substantially planar surface of the primary article.

8. The transaction product assembly of claim 6, wherein the panel is one of translucent and transparent and the account identifier is positioned on the transaction card to be viewable through the panel.

9. The transaction product assembly of claim 6, wherein at least an edge of the transaction card extends out of the pocket when the transaction card is positioned within the pocket.

10. The transaction product assembly of claim 9, wherein the substantially planar surface of the primary article has larger overall dimensions than the transaction card, and the transaction card is maintained within the overall dimensions of the primary article when the transaction card is positioned within the pocket.

11. The transaction product assembly of claim 1, wherein the primary article includes interactive, non-transactional functionality.

12. The transaction product assembly of claim 1, wherein the supporting backer defines at least two panels separated by at least one fold line, the flap is defined in an internal portion of one of the at least two panels, and the supporting backer is configured to be folded about the at least one fold line to wrap around the transaction product.

13. The transaction product assembly of claim 1, wherein the flap is substantially U-shaped.

14. The transaction product assembly claim 1, wherein the panel is at least partially elastic such that the flap is held in the pocket between the panel and the substantially planar surface of the primary article by compression.

15. A stored-value assembly comprising:
means for defining a sleeve;
means for linking the stored-value assembly with at least one of an account and a record having a value associated therewith such that the stored-value assembly can be used as payment toward a purchase of one or more of goods and services, wherein the means for linking is coupled with the means for defining the sleeve; and means for supporting the means for defining the sleeve including means for extending from a remainder of the means for supporting, wherein:

the means for extending is positioned at least partially within the sleeve to facilitate selective coupling of the means for defining the sleeve to the means for supporting, and the means for supporting is formed separately from the means for defining the sleeve.

16. The stored-value assembly of claim 15, wherein the means for linking is fixedly secured to the means for defining the sleeve.

17. The stored-value assembly of claim 15, further comprising a card, wherein the means for linking is fixedly connected to the card, and the card is removably maintained within the sleeve.

18. The stored-value assembly of claim 15, wherein the means for defining the sleeve includes:

means for providing non-transactional functionality to the stored-value assembly and defining a substantially planar surface, and means for covering at least a portion of the substantially planar surface to define the sleeve between the means for covering and the substantially planar surface.

19. The stored-value assembly of claim 18, further comprising a card separate from the means for defining the sleeve and the means for supporting, wherein the means for linking is fixedly connected to the card, and the card is removably maintained within the sleeve on an opposite side of means for extending as compared to the means for providing non-transactional functionality.

20. The stored-value assembly of claim 15, wherein the means for providing the sleeve includes means for maintaining the means for extending in compression while the means for extending is positioned within the sleeve.

21. A method of providing a product assembly, the method comprising:

providing a transaction product including:

a primary article, a cover member extending over a surface of the primary article to define a sleeve between the surface of the primary article and the cover member, and an account identifier linking the transaction product to an account or a record such that the transaction product can be used during a purchase transaction to apply at least a portion of a balance of the account or the record toward a price of a purchase;

providing a carrier defining a flap in an internal portion of the carrier; and sliding the flap of the carrier into the sleeve of the transaction product to at least partially couple the carrier to the transaction product.

22. The method of claim 21, wherein providing the transaction product includes providing the account identifier fixedly applied to at least one of the primary article and the cover member.

23. The method of claim 21, wherein the cover member is one of translucent and transparent, and providing the transaction product includes:

providing a transaction card separate from the primary article and the cover member, the account identifier being fixedly applied to the transaction card, and sliding the transaction card into the sleeve such that the account identifier fixedly applied to the transaction card is readable through the cover member;

wherein upon final assembly of the product assembly, the flap extends between the transaction card and the surface of the primary article.

24. The transaction product assembly of claim 6, wherein the primary article is a folded tote bag.

* * * * *